Feb. 11, 1969

J. C. RICHEL 3,426,634

SHEARING DEVICE

Filed April 27, 1966

INVENTOR
John C. Richel.
John D. Mesaros
ATTORNEY

United States Patent Office 3,426,634
Patented Feb. 11, 1969

3,426,634
SHEARING DEVICE
John C. Richel, Leechburg, Pa., assignor to Allegheny Ludlum Steel Corporation, Brackenridge, Pa., a corporation of Pennsylvania
Filed Apr. 27, 1966, Ser. No. 545,654
U.S. Cl. 83—355  7 Claims
Int. Cl. B26d 1/14, 7/06

ABSTRACT OF THE DISCLOSURE

Described herein is a shearing device which comprises a pair of cutting discs adapted to rotate about an axis perpendicular to the axis of the disc. The discs are carried by a casing which is also adapted to rotate. Means are provided for guiding strip materials to be cut into the path of the rotating discs along with means for driving the casing and the cutting discs to provide cutting action.

---

This invention relates to a shearing device and more particularly to a shearing device to be used for cutting into scrap, waste strips of material resulting from edge-trimming of strip material.

In edge-trimming of steel strip material, the trimmed edges result in waste material which must be disposed of in a manner that is most suitable to the type of metal involved. Some of it is reused as scrap for remelting in a furance. For ease of handling, the waste is cut into short sections by devices known as "scrap choppers."

Prior art shearing devices or "scrap choppers" usually consist of a set of rectangular knives in an arrangement where one knife is mounted rigidly on the frame of the machine, while one or more knives are mounted on an arbor which rotates, causing the rotating knives to work in conjunction with the stationary knife. Suitable clearance is provided so as to produce a cutting or chopping action as the scrap strip is fed into the chopper at the point where the rotating knives are passing the stationary knife. One of the inherent weak points in this system is that the chopping action produces a shock load that is detrimental to the cutting edges of the knives and to the bearings of the machine.

Accordingly, it is an object of this invention to provide a new and improved shearing device.

It is another object of this invention to provide a new and improved shearing device which uses shearing action by means of circular cutting discs.

It is still another object of this invention to provide a new and improved shearing device in which the knife edge wear is uniformly distributed about the circumference of the cutting discs.

It is a further object of this invention to provide a new and improved shearing device in which the shock load to the bearings and knives is minimized.

Briefly, the present invention accomplishes the above cited objects by providing a new and improved shearing device in which two parallel pairs of cutting discs rotate about an axis perpendicular to the axes of the discs, while each pair of cutting discs rotates in such a manner to produce the necessary shearing action. The scrap strip is fed into the shearing device so that it is intercepted and cut into short sections, first by one pair of cutting discs, and then by the second pair of cutting discs.

Figure 1:
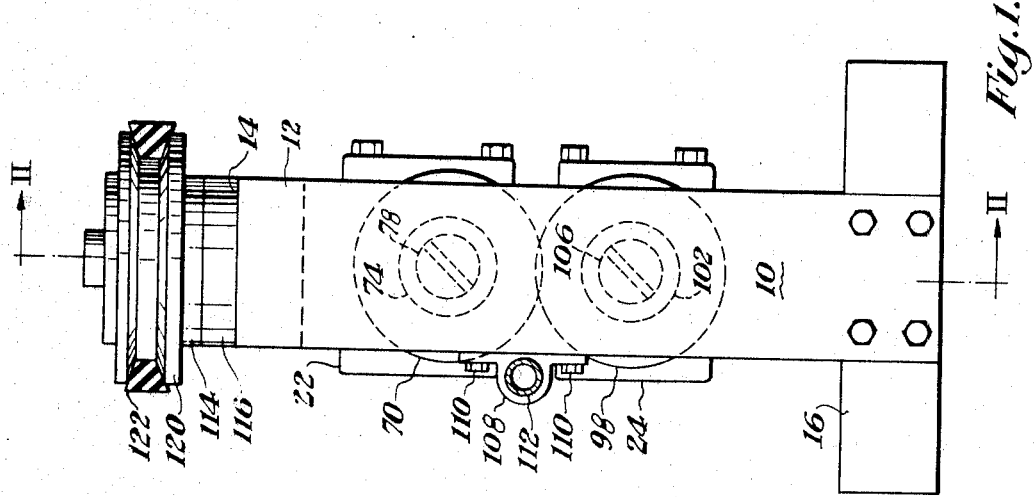
Figure 2:
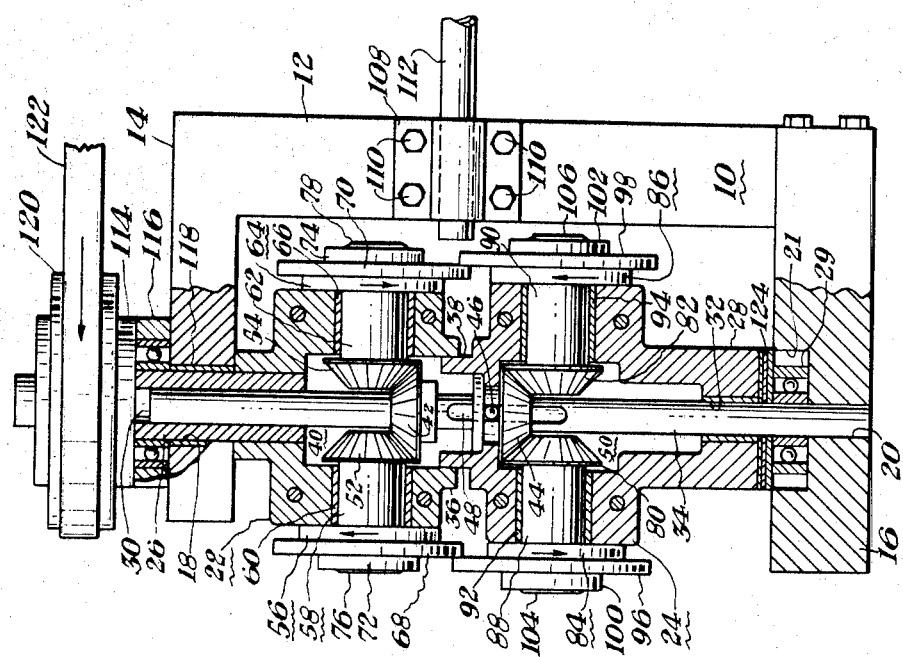

Further objects, features and advantages will become apparent from the following description when taken in conjunction with the accompanying drawings in which:

FIGURE 1 is a side elevational view of the shearing device according to the invention, and FIG. 2 is a partially sectioned view of the device of FIG. 1 taken along line II—II thereof.

Referring now to the drawings, there is shown a generally C-shaped frame member 10 having a bight portion 12, an upper arm 14, and a lower arm 16 parallel to the upper arm 14. Aligned apertures 18 and 20 are located respectively in the upper arm 14 and lower arm 16 of frame member 10. An upper casing 22 and a lower casing 24, each having hub portions 26 and 28, respectively, are adapted for rotative movement with respect to the frame member 10. The hub portion 26 of upper casing 22 is inserted through aperture 18 of upper arm 14 of frame 10. Coaxially aligned with the hub portion 26 is is hub portion 28 of lower casing 24 which rotates on bearing 29 which is inserted into a recess 21 adjacent aperture 20 of lower arm 16 of frame member 10. Through the hub portions 26 and 28 of casings 22 and 24, respectively, are located apertures 30 and 32 which are coaxially aligned and are concentrically located within the hubs. A shaft 34 extends through the apertures 30 and 32 and is secured at its lower end of the lower arm 16 of frame member 10 to prevent movement with respect to frame member 10. The casings 22 and 24 are adapted for simultaneous rotation about the axis formed by the vertical shaft 34. The casing 22 has a projection 36 which slidably engages a mating projection 38 of casing 24. Once projection 38 is positioned within projection 36, the two are secured together in some suitable manner.

Secured to the shaft 34 in the central cavity 40 of casing 22 is a bevel gear 42. A similar bevel gear 44 is positioned on shaft 34 and restrained from rotational movement by a pin 46 inserted through the bevel gear 44 and through a slot 48 on shaft 34. The bevel gears 42 and 44 are arranged in back-to-back relationship for reasons which will become obvious. The gear 44 located within cavity 50 of casing 24 is arranged for slidable movement along the axis of the shaft 34 to provide a vertical adjustment which will be explained in conjunction with the operation of the shearing device.

A pair of facing diametrically opposed bevel gears 52 and 54 are positioned to cooperate with fixed bevel gear 42 within cavity 40 of casing 22. The bevel gear 52 is at one end of an arbor 56 which has a journal 58 adapted for rotation within sleeve bearing 60 secured to casing 22. The journal 58 is generally perpendicular to the shaft 34. Axially aligned with the journal 58 is the journal 62 of arbor 64 which is driven by bevel gear 54. The journal 62 rotates within the sleeve bearing 66 secured to casing 22. Externally of casing 22 there are secured two cutting discs 68 and 70 to the faces of arbors 56 and 64, respectively, by means of washers 72 and 74 and screws 76 and 78. The cutting discs 68 and 70 are generally parallel to each other and to the axis of the shaft 34.

A similar mechanism is employed within casing 24. Two bevel gears 80 and 82 coact with bevel gear 44 within cavity 50 of casing 24. Connected to the bevel gears 80 and 82 are arbors 84 and 86, respectively, having journals 88 and 90 rotating with sleeve bearings 92 and 94, respectively. Circular cutting discs 96 and 98 are secured to arbors 84 and 86, respectively, by washers 100 and 102 along with screws 104 and 106. The axis for journals 88 and 90 within casing 24 is parallel to the axis for journals 58 and 62 with casing 22.

The cutting discs 70 and 98 are a coacting pair with the outer face of disc 98 overlapping the inner face of disc 70 to provide a cutting edge. Similarly, cutting discs 68 and 96 overlap to form a second pair of coacting cutter surfaces, diametrically opposite from, and parallel to the first pair of cutter surfaces.

A strip guide 108 is secured to the bight portion 12 of frame member 10 by screws 110. The strip guide 108 has a tube 112 through which the scrap strip (not shown) passes, the tube 112 being so arranged as to direct the scrap strip into the path of the cutting discs 70 and 98 at the point of overlap to thereby permit the shearing of the strip.

The hub projection 26 of casing 22 extends above the arm 14 of frame member 10 where a circular flange 114 is secured to the hub 26. A thrust bearing 116 is positioned intermediate the flange 114 and the arm 14, and a sleeve bearing 118 surrounds the hub 26 and is secured to the arm 14. A pulley 120 is secured to the flange 114 and a drive belt 122 coacts with the pulley 120 and suitable drive means (not shown) cause the pulley 120 to run in the direction of rotation indicated by the arrow on the fan belt 122.

In operation, briefly, as the casings 22 and 24 rotate with respect to the frame 10, the first pair of coacting cutting discs 70 and 98, and the second pair of coacting cutting discs 68 and 96, rotate with respect to the casings 22 and 24, each disc of each pair of discs rotating in a direction opposite to the other with both discs cooperating to urge the strip toward the cutting portion thereof.

In detail, a motor drive means (not shown) drives the belt 122 and causes rotation of pulley 120 in the direction indicated by the arrow on the belt 120. The casing 22 which is secured to the pulley 120 by means of the hub 26 and the flange 114 rotates concurrently with the pulley 120 about an axis defined by the shaft 34 which is fixed to the frame member 10 at lower arm 16 thereof.

Casing 24 also rotates concurrently with casing 22 since they are secured together by means of projection 36 on casing 22 and mating projection 38 on casing 24. The casings 22 and 24 are disposed so a parallel relationship exists between the axes formed by the axis of rotation of each parallel pair of cutting discs. The bevel gears 42 and 44 are secured to the fixed shaft 34 and consequently do not rotate. The bevel gears 52 and 54 which are coaxially aligned, rotate in the direction indicated by the arrows on the respective arbors 56 and 64, while the bevel gears 80 and 82 rotate on the same axis in the direction indicated by the arrows on the respective arbors 84 and 86. The bevel gear arrangement is so constructed that for each revolution of the simultaneously revolving casings 22 and 24, the circumference of each disc of each pair of cutting discs will precess by at least one gear tooth. Consequently, the fixed bevel gears 42 and 44 would have the same number of gear teeth and the four rotating bevel gears would have one gear tooth less. This is done to prevent each pair of cutting discs from making a cut at the same place for each revolution of the casings 22 and 24, which would happen if the gears were at a one to one ratio.

The scrap strip is fed to the cutting mechanism through the tube 112 of the strip guide 108 at a point where the coacting cutting discs 70 and 98 will intercept the strip during the revolution of the casings 22 and 24. The cutting discs 70 and 98 are rotating in such a direction to urge the strip toward the cutting edges. During a half revolution of the casings 22 and 24, the strip is advancing and then it is intercepted by the other pair of coacting cutting discs 68 and 96 which rotate in the proper direction to urge the strip toward the cutting edges.

Adjustment of the cutting discs can be made by insertion of shims between the respective arbor and cutting disc while vertical adjustment is provided by means of shims 124 between the hub 28 and the bearing 29, the shims 124 used in conjunction with the fastening means securing projection 36 of casing 22 to projection 38 of casing 24, to regulate the distance between the parallel axes of the coacting cutting discs.

While there has been shown and described one specific embodiment, it is to be understood that various other adaptations and modifications can be made without departing from the spirit and scope of the invention.

I claim:
1. A shearing device for cutting strip material into sections, said device comprising:
   (a) a stationary frame member;
   (b) a casing adapted to be rotated relative to said frame member about a shaft, at least one end of which is secured to said frame member;
   (c) at least one pair of coacting cutting discs carried by said casing and adapted for rotation relative to said casing, said casing including means cooperating with said shaft and said cutting discs to impart rotary motion to said cutting discs as said casing means is driven;
   (d) means for guiding strip material into the path of the coacting portion of said pair of discs; and
   (e) means for driving said casing and said cutting discs to provide cutting action.

2. The combination of claim 1 wherein said means to impart rotary motion to said cutting discs is gear means adapted for rotating said discs in opposite directions and in the directions to urge the strip material in toward the coacting portion of said pair of discs.

3. A shearing device for cutting strip material into sections, said device comprising:
   (a) a generally C-shaped frame member having a pair of spaced generally parallel arm portions and an interconnecting bight portion;
   (b) a shaft affixed to at least one arm of said frame member, said shaft being generally parallel to the bight portion of said frame member;
   (c) casing means adapted for rotative movement about said shaft;
   (d) a pair of parallel shafts extending out from said casing means generally perpendicular to said fixed shaft and adapted for rotation relative to said casing means;
   (e) a cutting disc secured to each of said parallel shafts external of said casing means, said cutting discs overlapping at portions thereof;
   (f) drive means for rotating said casing about said fixed shaft;
   (g) gear means within said casing cooperating with said fixed shaft and each of said parallel shafts, said gear means being adapted for rotating said discs as said casing rotates about said fixed shaft to provide cutting action by the coacting discs, and
   (h) means for guiding strip material into the path of the coacting portion of said pair of discs for severing said material.

4. The combination of claim 3 wherein a second pair of parallel shafts extend out of said casing means, each shaft of said second pair of parallel shafts being generally coaxial with the adjacent shaft of the said first pair of parallel shafts, a cutting disc secured to each of said second pair of shafts in an overlapping relationship, said gear means cooperating with said second pair of parallel shafts whereby cutting action is provided every one-half revolution of said casing means.

5. The combination of claim 3 wherein said gear means are adapted to provide fractional relationship between the revolutions of the cutting disc with respect to the revolutions of the casing means whereby the cutting action by the coacting disc is distributed about the periphery of the discs.

6. The combination of claim 3 wherein said gear means includes a first and a second bevel gear secured to said fixed shaft and a third and a fourth bevel gear secured to each shaft of said pair of parallel shafts, said third and fourth bevel gears engaging said first and second bevel gears, respectively, whereby said cutting discs are rotated by the rotation of the casing means about said fixed shaft.

7. The combination of claim 3 wherein said gear means are adapted for rotating said discs in opposite directions and in the direction to urge the strip material in toward the overlapping portion of the cutting discs.

References Cited

UNITED STATES PATENTS

| 1,309,661 | 7/1919 | Smith | 83—490 X |
| 2,391,719 | 12/1945 | Llewellyn | 83—355 |
| 2,500,772 | 3/1950 | Reed | 83—923 X |
| 3,080,783 | 3/1963 | Knepshield | 83—479 |
| 3,260,146 | 7/1966 | Child | 83—479 |

ANDREW R. JUHASZ, *Primary Examiner.*

F. T. YOST, *Assistant Examiner.*

U.S. Cl. X.R.

83—444, 479, 646, 923